United States Patent [19]

Clark

[11] Patent Number: 4,902,409
[45] Date of Patent: Feb. 20, 1990

[54] NOZZLE FOR SCREEN APPARATUS

[75] Inventor: Jack W. Clark, Lewisburg, Pa.

[73] Assignee: Sprout-Bauer, Inc., Muncy, Pa.

[21] Appl. No.: 145,603

[22] Filed: Jan. 19, 1988

[51] Int. Cl.⁴ ................................................ B07B 1/06
[52] U.S. Cl. ..................... 209/250; 209/273; 209/281; 210/420; 210/456; 239/599
[58] Field of Search ............ 209/13, 17, 273, 281, 209/250, 254, 273, 274, 380, 268, 278; 406/171; 239/599, 568; 210/420, 456

[56] References Cited

U.S. PATENT DOCUMENTS

| | | | |
|---|---|---|---|
| 1,958,044 | 5/1934 | Hendricks | 239/599 X |
| 4,128,206 | 12/1978 | Bitner | 239/599 X |
| 4,202,777 | 5/1980 | Schall | 209/254 X |
| 4,218,020 | 8/1980 | Reider | 239/599 X |
| 4,236,674 | 12/1980 | Dixon | 239/599 X |
| 4,471,913 | 9/1984 | Hofmann | 239/567 X |
| 4,512,880 | 4/1985 | Connolly | 209/281 X |

Primary Examiner—Kevin P. Shaver
Assistant Examiner—Edward S. Ammeen
Attorney, Agent, or Firm—Chilton, Alix & Van Kirk

[57] ABSTRACT

A nozzle block (66) and a sieve screen unit (12), in which the outlet aperture (78) of the nozzle body (68) has a substantially oval shape to produce a fan-shaped flow pattern against the screen (24). Two nozzle blocks (66a), (66b) are mounted within the sieve screen housing (24), each block having a substantially solid, cuboid body including an outlet aperture that distributes slurry over the full width of the screen.

9 Claims, 2 Drawing Sheets

NOZZLE FOR SCREEN APPARATUS

BACKGROUND OF THE INVENTION

The present invention relates to pressure fed screen sieves, and more particularly, to an improved nozzle for spraying slurry onto such screens.

Conventionally, such sieve screen equipment includes a plurality of rectangular nozzle blocks with a cylindrical channel therethrough, such that when the block is mounted at one end of the screen, the slurry forced through the channel is dispersed in a spray pattern on the screen. The inventor has recognized that the use of a cylindrical flow channel in the block has several inherent inefficiencies and limitations.

SUMMARY OF THE INVENTION

It is thus an object of the present invention to improve the spray distribution pattern of the nozzle blocks, and to reduce their cost and complexity, relative to conventional sieve screen equipment.

This is accomplished in accordance with the invention, by a slurry spray nozzle that has an effectively oval outlet aperture. Such nozzle preferentially sprays the slurry along a wider pattern than conventional, cylindrical nozzles.

When the nozzle in accordance with the present invention is mounted at one end of a longitudinal screen, a wider, horizontally directed spray pattern from a single nozzle can cover substantially the entire width of the screen. The screen efficiency is thus increased because the slurry flow is distributed over a larger area of the screen.

The relatively narrow extent of the spray pattern as it contacts the screen, i.e., the narrow extent in the screen longitudinal direction, has additional advantages. Because the oval aperture can distribute the flow onto the screen in a thin layer, the aperture can be sized to handle twice the flow of the cylindrical channel of an existing nozzle block it replaces, yet maintain efficient distribution. Thus, the number of nozzle connections can be reduced relative to conventional equipment.

Moreover, with the wider spray pattern and higher total capacity relative to conventional nozzles, sufficient capacity is available to utilize only a single nozzle on a given conventional screen. This significantly reduces the amount of turbulence on the screen surface which, in prior systems, results from the collision or mixing of two or more spray streams. Turbulence on the screen surface significantly decreases screening efficiency.

BRIEF DESCRIPTION OF THE DRAWINGS

These and other features and advantages of the invention will be described below with reference to the accompanying drawings, in which.

DESCRIPTION OF THE PREFERRED EMBODIMENT

Figure 1:
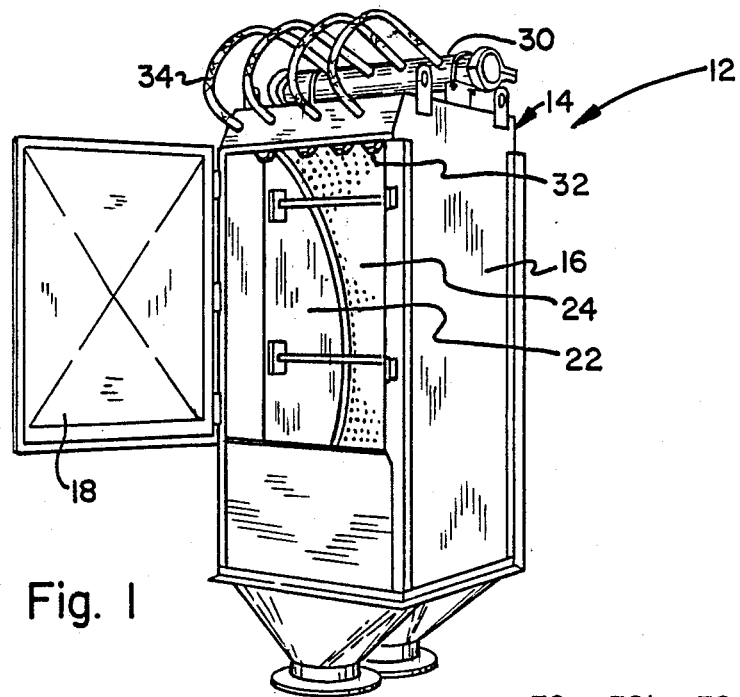
FIG. 1 is a perspective view of a pressure fed sieve screen unit into which the present invention can be incorporated.
Figure 2:
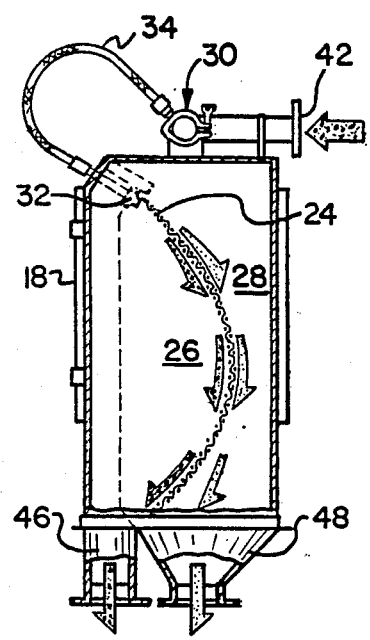
FIG. 2 is a schematic illustration of the flow path associated with the spraying of slurry onto the screen in the unit shown in FIG. 1.

FIGS. 1 and 2 show a pressure fed screen sieve unit 12 having a generally cuboid housing 14 including side panels 16 and a door 18. The open door 18 exposes the housing interior 22 in which a screen 24 is mounted. The screen 24 substantially spans the longitudinal dimension of the housing 14 and defines a solids zone 26 and an effluent zone 28.

At the upper exterior of the housing 14, a header or manifold 30 is adapted to receive a source of slurry, typically containing nonabrasives such as vegetable fiber, fines from white water or spent cooking liquors, or other solids removal or recovery material from various other processing or waste water treatment operations. Conventionally, a plurality, typically four delivery tubes 34 connect the header to a respective four nozzles 32 which are mounted in the housing 14. The nozzles are typically mounted adjacent the width edge at the upper end of the screen 24, in side-by-side relation, oriented to direct discharge flow logitudinally along the screen. The screen is typically somewhat bowed in a 120° arc, as shown in FIG. 2. Incoming feed is pumped through fitting 42 into the header manifold 30 under pressure, for example, 22 to 40 psi, depending on the slurry, screen slot size and desired end results. The slurry is then directed tangentially onto the upper end of the curved screen 24. Larger, oversized solids move downward on the surface of the screen to the oversized discharge port 46, and the liquid effluent and finer solids pass through the screen openings and out the effluent port 48. The velocity of the slurry discharged from the nozzles 32 and the shearing action of the curved screen 24 produce accurate, positive separation of the material.

Figure 3:
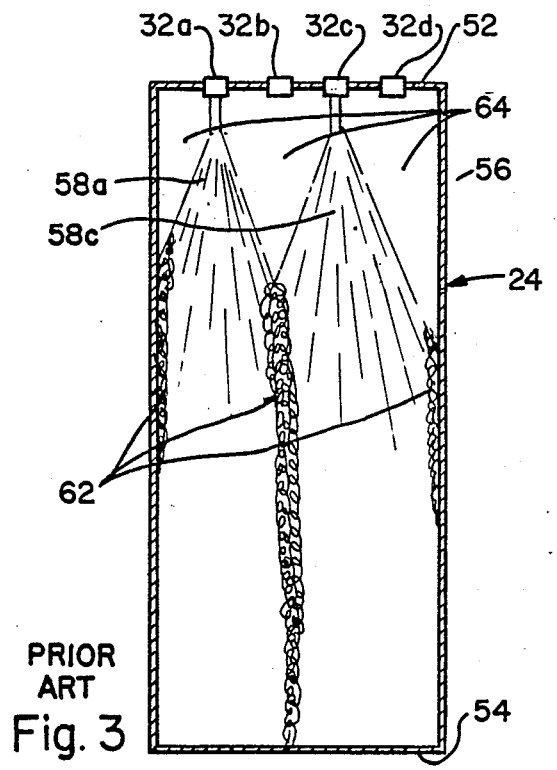
FIG. 3 illustrates the interaction of two spray patterns on the screen, as occurs with prior art nozzles.

FIG. 3 is an illustration, taken through the front of the housing, during discharge of the slurry through the nozzles 32a–32d. Typically, for a given unit 12, only two of the four available nozzles, such as 32a, 32c are operated simultaneously. When viewed from the front, the screen has a short, upper edge 52 and a short lower edge 54, defining the width of the screen, and two longitudinal edges 56. Conventionally, each nozzle 32 is formed as a substantially solid block having a central, cylindrical bore which acts as a discharge nozzle to produce a substantially conical flow pattern, indicated at 58a and 58c, corresponding respectively to nozzles 32a, 32c. Two nozzles are typically required to provide efficient utilization of the available screen surface, i.e., two nozzles are required for their combined spray patterns to cover the full width of the screen 24. Approximately at the longitudinal center line of the screen 24, the crossing of the spray patterns produces substantial turbulence 62. Additional turbulence 62 occurs at the longitudinal edges 56. With conventional nozzles and their associated conical spray patterns, a substantial screen area 64 is unavailable for filtering.

Figure 4A:
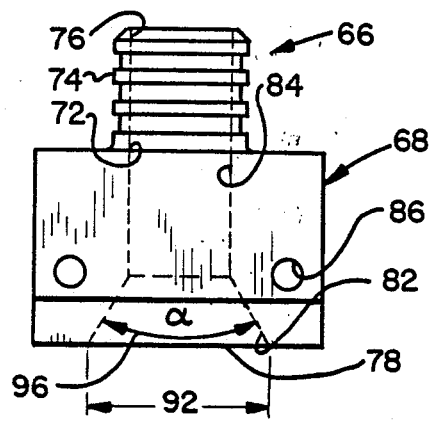
FIG. 4(a)–(c) show a plan, a front elevation, and a side sectional view of the improved nozzle block in accordance with the present invention.
Figure 4C:
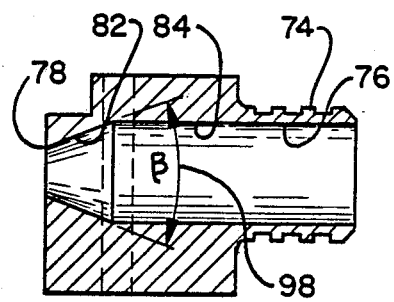
Figure 4B:
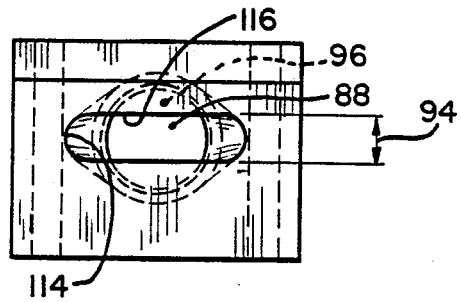

FIGS. 4(a)–(c) illustrate the preferred embodiment of the present invention. The improved nozzle block 66 includes a substantially cuboid body portion 68 which has been drilled to include an inlet aperture 72, preferably of circular cross section. The inlet aperture 72 may be fluidly connected to an inlet extension 74 having a cylindrical bore 76. The outlet side of the body 68 includes a substantially oval outlet aperture 78 centered substantially on the center line of the cylindrical portion of the flow channel 84 through the block 66. The cylindrical portion of the flow channel 84 is connected to a tapered transition portion 82, which has a decreasing taper 98 from the top and bottom of the body 68 toward the center line, and an increasing taper 96 from the center line toward the sides of the body 68. The taper angles α and β may be selected based on the type of fluid to be discharged through the nozzle. A pair of holes 86 may also be provided for the purpose of fastening the nozzle block 66 to the housing.

The cross sectional area 88 of the transition region 82, and particularly the outlet aperture 78, is at least equal to the cross sectional area of the cylindrical portion 84 of the flow channel. Although the inventor has used the term "oval" to describe the shape of the outlet aperture 78, it should be appreciated that substantially any shape in which the major dimension, such as indicated at 92 transverse to the flow channel center line, is larger than the diameter of the cylindrical portion of flow channel 84 and the perpendicular minor dimension 94 is smaller than the diameter of the flow channel 84, would be considered an oval. The preferred shape of the oval includes semicircular side edges 114 and straight, parallel upper and lower edges 116. As will be described more fully below, the effect of this transition region and oval shaped outlet aperture is to produce a fan-shaped spray pattern, having a greater horizontal extent and a lesser vertical extent, as viewed coming out of the pane of the drawing in FIG. 4(b).

Figure 5:
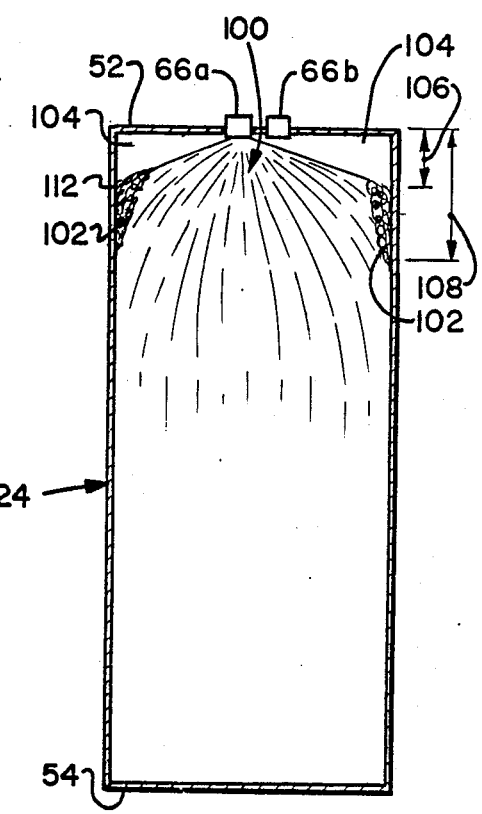
FIG. 5 is an illustration of the slurry flow pattern obtained with the improved nozzle shown in FIG. 4.

FIG. 5 is a schematic of the nozzle spray or flow pattern 100 associated with the present invention, showing the improvement in the pattern relative to that associated with the prior art nozzle 32 and pattern 58 shown in FIG. 3. With the present invention, a screen unit can be fitted with only two nozzles 66a and 66b, while providing substantially the same filtering capacity, thus affording a fabrication and assembly cost savings. With the wider horizontal flow pattern 100, a single nozzle 66a can cover the full width of the screen 24 while eliminating turbulence in the longitudinal center line of the screen, and producing only slight turbulence 102 at the longitudinal edges 112 of the screen. For example, with single nozzle 66a connected to the housing at substantially the upper edge 52 of the screen, the spray pattern 100 with the nozzle described in connection with FIG. 4 fully spans the screen, at a distance 108 from the mounting edge 52 that is less than approximately one-half the length of the edge 52. This minimizes the unused area 104 of the screen. Preferably, the nozzle spray pattern spans the full width of the screen within a distance 106 equal to one-quarter the width of the screen along edge 52.

The oval outlet aperture of the present invention directs the slurry material at the screen over a wide horizontal area and thus can handle a higher capacity flow than would a comparably sized circular outlet aperture. If the size of a circular outlet aperture were increased, for example in an attempt to utilize a single nozzle to cover a full screen, much of the conical pattern would either miss the screen entirely or would impinge on the screen so near the lower edge 54 that little filtering would occur.

Although the preferred embodiment of the nozzle block 66 has been described, it should be appreciated that other configurations of the structure defining the oval outlet aperture 78 also fall within the scope of the invention when combined with the sieve screen equipment of the type described herein. Thus, a variety of nozzles which provide a wide but thin spray stream can be used without departing from the scope of the invention.

What is claimed:

1. A pressure fed sieve screen apparatus comprising:
   a housing having a longitudinal dimension;
   a screen having longitudinal and width dimensions mounted within the housing to define a solids zone and an effluent zone on respective solids and effluent sides of the screen;
   at least two nozzle blocks mounted within the housing along the width dimension of the screen, each block having an inlet aperture for admitting slurry into the nozzle and outlet means fluidly connected to the inlet aperture, the outlet means extending in the width direction of the screen a distance no greater than one half the width dimension of the screen, for distributing the slurry onto the solids side of the screen in a fan-shaped flow pattern that spreads out along and substantially spans the width dimension of the screen; and
   means for supplying slurry under pressure to each nozzle inlet aperture, whereby each nozzle can be operated alone in alternation to discharge slurry over the full width of the screen.

2. The sieve screen apparatus of claim 1, wherein each block has a flow channel with a longitudinal center line aligned substantially parallel to the longitudinal dimension of the screen, said flow channel includes a cylindrical portion, and the outlet means includes an oval outlet aperture defined by major and minor dimensions oriented transversely to the flow channel center line, the major dimension being larger than the flow channel diameter and the minor dimension being smaller than the flow channel diameter.

3. The sieve screen apparatus of claim 1, wherein each block has a flow channel with a longitudinal center line aligned substantially parallel to the longitudinal dimension of the screen, said flow channel includes a cylindrical portion adjacent the inlet aperture, and the outlet means includes an outlet aperture and, a tapered transition portion between the cylindrical portion and the outlet aperture.

4. The sieve screen apparatus of claim 3, wherein the cross sectional areas of the outlet aperture and the transition portion are substantially equal to the cross sectional area of the cylindrical portion.

5. The sieve screen apparatus of claim 2, wherein the major dimension is defined by opposed semicircular portions of the outlet aperture, and the minor dimension is defined by opposed, parallel straight edges of the outlet aperture.

6. The sieve screen apparatus of claim 3, wherein the transition portion has an increasing taper from the cylindrical portion to a major dimension, and a decreasing taper from the cylindrical portion to a minor dimension.

7. The sieve screen apparatus of claim 1, wherein the screen has a longitudinal edge and a width edge, the nozzles are mounted side-by-side along the screen width edge for discharging the slurry substantially longitudinally onto the screen and
   the outlet means includes a substantially oval aperture having major and minor dimensions, the major dimension being substantially parallel to the screen width edge.

8. The sieve screen apparatus of claim 7, wherein for each nozzle the relationship of the major and minor dimensions of the aperture is such that the width of the flow pattern is substantially equal to the width of the screen when the sprayed slurry has traveled a distance from the nozzle equal to less than about one-half the screen width dimension.

9. The sieve screen apparatus of claim 1 wherein each block has a flow channel with a longitudinal center line aligned substantially parallel to the longitudinal dimension of the screen and a substantially solid, cuboid body and the flow channels, respectively, extend through said bodies.

* * * * *